(12) United States Patent
Browne et al.

(10) Patent No.: US 7,293,836 B2
(45) Date of Patent: Nov. 13, 2007

(54) SEAT ASSEMBLIES INCLUDING A SEAT STROKING DEVICE AND METHODS OF USE

(75) Inventors: Alan L. Browne, Grosse Pointe, MI (US); Chandra S. Namuduri, Troy, MI (US); John C. Ulicny, Oxford, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 147 days.

(21) Appl. No.: 11/221,005

(22) Filed: Sep. 7, 2005

(65) Prior Publication Data

US 2007/0063566 A1   Mar. 22, 2007

(51) Int. Cl.
   A47C 1/023   (2006.01)
   F16M 13/00   (2006.01)
(52) U.S. Cl. .................. 297/344.11; 248/429
(58) Field of Classification Search .......... 297/344.11; 248/429, 430
See application file for complete search history.

(56) References Cited

U.S. PATENT DOCUMENTS

| | | | | |
|---|---|---|---|---|
| 4,262,963 A * | 4/1981 | Bauer et al. | ............ | 248/429 X |
| 4,283,036 A * | 8/1981 | Tsuda et al. | ................ | 248/429 |
| 4,304,386 A * | 12/1981 | Nagashima et al. | ........ | 248/429 |
| 4,526,424 A * | 7/1985 | Korth | ...................... | 248/430 X |
| 4,756,503 A * | 7/1988 | Fujita | ...................... | 248/430 |
| 4,811,925 A * | 3/1989 | Fujita et al. | ................ | 248/430 |
| 4,909,560 A * | 3/1990 | Ginn | ........................ | 248/429 X |
| 5,407,166 A | 4/1995 | Pilarski | ...................... | 248/430 |
| 5,447,352 A * | 9/1995 | Ito et al. | ................ | 248/429 X |
| 5,575,449 A * | 11/1996 | Shinbori et al. | ............ | 248/429 |
| 5,641,146 A * | 6/1997 | Hoshihara et al. | .......... | 248/430 |
| 5,741,000 A * | 4/1998 | Goodbred | .................... | 248/430 |
| 5,746,409 A * | 5/1998 | Rees | ...................... | 248/429 X |
| 5,765,798 A * | 6/1998 | Isomura | ...................... | 248/430 |
| 5,878,859 A * | 3/1999 | Borlinghaus et al. | ... | 248/429 X |
| 6,036,157 A | 3/2000 | Baroin et al. | ............... | 248/429 |
| 6,053,529 A * | 4/2000 | Frusti et al. | ............. | 248/429 X |
| 6,478,280 B2 * | 11/2002 | Saitoh | ........................ | 248/429 |
| 6,511,032 B1 | 1/2003 | Lee | .............................. | 248/429 |
| 6,767,029 B2 * | 7/2004 | Jaudouin et al. | ........ | 248/429 X |
| 6,808,233 B2 | 10/2004 | Mallard | .................... | 297/344.1 |
| 6,836,717 B2 | 12/2004 | Bucchele et al. | ............ | 701/45 |
| 6,851,655 B2 * | 2/2005 | Kume et al. | ............... | 248/429 |
| 6,854,782 B2 * | 2/2005 | Reichert et al. | ........ | 280/735 X |
| 6,935,692 B2 * | 8/2005 | Nishide et al. | ........ | 297/344.11 |
| 2004/0084926 A1 | 5/2004 | Muller et al. | ............ | 296/65.14 |
| 2005/0051694 A1 | 3/2005 | Willems et al. | ............ | 248/429 |
| 2005/0087408 A1 | 4/2005 | Namuduri et al. | ....... | 188/267.1 |
| 2005/0087409 A1 | 4/2005 | Browne et al. | .......... | 188/267.2 |
| 2005/0087410 A1 | 4/2005 | Namuduri et al. | ....... | 188/267.2 |
| 2005/0104391 A1 | 5/2005 | Browne et al. | ............. | 293/132 |
| 2007/0069100 A1 * | 3/2007 | Schuler et al. | ............. | 248/430 |

* cited by examiner

*Primary Examiner*—Rodney B. White

(57) ABSTRACT

A seat assembly including a seat stroking device for a vehicle and methods of use include a seat adjustment mechanism comprising a stationary rail fixedly attached to a vehicle floor and a movable rail slidably engaged with the stationary rail, wherein the seat adjustment mechanism is adapted to position a seat; an active material based stroking device having one end fixedly attached to a non-movable portion and an other end in operative communication with the movable rail; and a controller in operative communication with the active material, wherein the controller is operable to selectively apply an activation signal to the active material and effect a change in an attribute of the active material, wherein the change in the attribute results in force and acceleration adjusting energy absorption.

19 Claims, 5 Drawing Sheets

US 7,293,836 B2

SEAT ASSEMBLIES INCLUDING A SEAT STROKING DEVICE AND METHODS OF USE

BACKGROUND

The present disclosure generally relates to stroking devices for vehicle seats, and more particularly to seat stroking devices that include tunable force, energy absorbing mechanisms.

Seats in motor vehicles are generally static in nature. That is, the seat provides substantially no stroking forces in the event of a deceleration event. In other words, the seat typically is fixedly attached relative to the vehicle frame.

While current seats are suitable for their intended purpose, it would be desirable for seats to be configured subject to other constraints to keep as low as practically possible the deceleration levels experienced by a belted seated occupant upon a deceleration event. It would be particularly advantageous if the response of these devices were tunable, especially in light of the fact that there is great variability in occupant masses and in rates of deceleration. It would also be advantageous if these devices were reversible (i.e., they could be triggered more than once without necessitating complete replacement).

BRIEF SUMMARY

Disclosed herein are seat assemblies employing active material based seat stroking devices for reducing/limiting the deceleration levels experienced by a belted. In one embodiment, the seat assembly comprises a seat adjustment mechanism comprising a stationary rail fixedly attached to a vehicle floor and a movable rail in slidably engaged with the stationary rail, wherein the seat adjustment mechanism is adapted to position a seat; an active material based stroking device having one end fixedly attached to a non-movable portion and an other end in operative communication with the movable rail; and a controller in operative communication with the active material, wherein the controller is operable to selectively apply an activation signal to the active material and effect a change in an attribute of the active material, wherein the change in the attribute results in force and acceleration adjusting energy absorption.

A process for reducing/limiting deceleration levels experienced by a belted seated occupant of a vehicle comprises detecting a deceleration event with a sensor, wherein the sensor is in operative communication with an active material based stroking device coupled to a movable rail of a seat assembly and a non-movable surface of the vehicle; releasing the seat assembly to provide translation of a seat within the seat assembly resisted by the stroking force provided by the active material based stroking device; variably applying an activation signal to the active material to alter the stroking force of the active material based stroking device; and reducing/limiting the mass dependent deceleration force levels experienced by the belted seated occupant through this alteration of the stroking force of the active material based stroking device.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
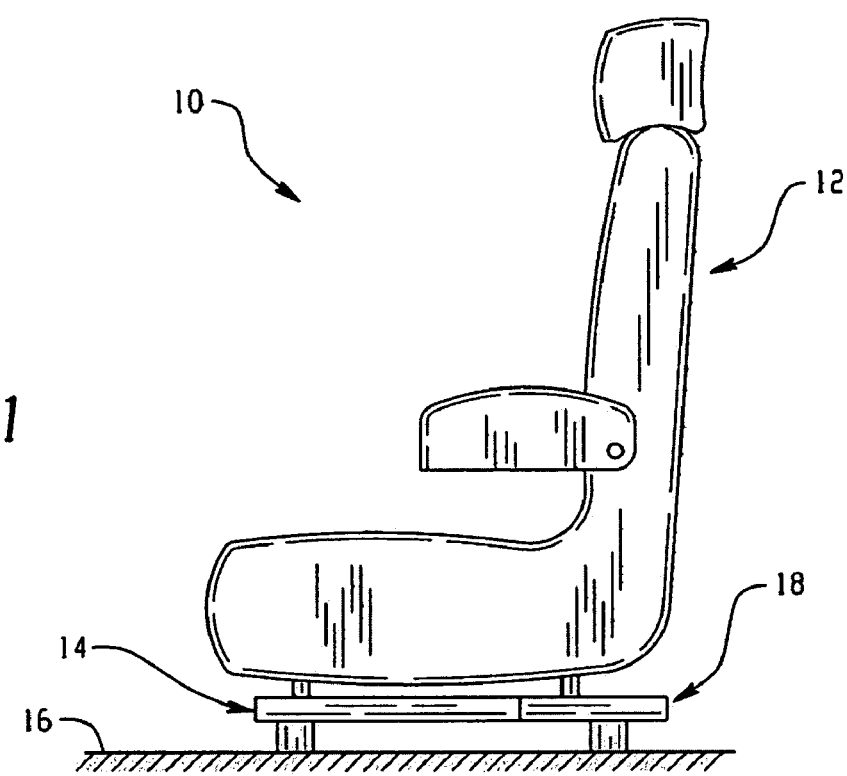
FIG. 1 is a schematic representation of a seat assembly.

Disclosed herein are force and deceleration reducing/limiting energy absorbing seat assemblies and methods for their use in motor vehicles. In contrast to the prior art, the seat assemblies include one or more active material based stroking devices for tuning the stroking force of the seat during an deceleration event, which advantageously allows selective control of the forces and accelerations to which the belted seated occupant may be subjected to while riding in the motor vehicle, especially while the motor vehicle is undergoing a rapid deceleration event.

The term "active material" as used herein refers to several different classes of materials, all of which exhibit a change in an attribute such as dimension, shape, shear force, and/or flexural modulus when subjected to at least one of many different types of applied activation signals, examples of such signals being thermal, electrical, magnetic, mechanical, pneumatic, and the like. A first class of active materials includes shape memory materials. These exhibit a shape memory effect. Specifically, after being deformed pseudoplastically, they can be restored to an original shape in response to the activation signal. Suitable shape memory materials include, without limitation, shape memory alloys (SMA) and ferromagnetic SMAs. A second class of active materials can be considered as those that exhibit a change in an attribute when subjected to the activation signal but revert back to their original state upon removal of the activation signal. Active materials in this category include, but are not limited to, piezoelectric materials, electroactive polymers (EAP), magnetorheological fluids and elastomers (MR), electrorheological fluids and elastomers (ER), composites of one or more of the foregoing materials with non-active materials, combinations comprising at least one of the foregoing materials, and the like.

The activation signal is dependent on the materials and/or configuration of the active material. For example, a magnetic and/or an electrical signal may be applied for changing the property of the active material fabricated from magnetostrictive materials. A thermal signal may be applied for changing the property of the active material fabricated from shape memory alloys. An electrical signal may be applied for changing the property of the active material fabricated from electroactive polymers, piezoelectrics, and electrostrictives.

As will be described in greater detail below, various embodiments include the use of tunable stroking force MR and ER dampers, which can be aligned in the fore and aft directions within the seat rails or within and about the attachment points of the seat to the vehicle floor, either in series with or in parallel to the seat itself. Other embodiments include the use of stroking devices based on shape memory alloys or the like, which can be configured in a similar manner as the above noted dampers to provide an energy-absorbing link. Still further, the use of electrohydraulic, piezoelectric, MR, EAP, and SMA activated valves can be employed for fluid type stroking devices. It should be noted and apparent to those skilled in the art that the power seat drive mechanism and motors commonly featured as an option in most vehicles can be utilized as a generator for developing the tunable force in any of the aforementioned embodiments. Optionally, the power seat drive mechanism and motors can be configured to provide a resisting force or a contributor to the resisting force to seat stroking as may be desired for some applications.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Directional descriptors used herein are with reference to the vehicle. Furthermore, all ranges disclosed herein are inclusive of the endpoints and independently combinable.

Referring now to FIG. 1, an exemplary seat assembly 10 is illustrated. The seat assembly 10 generally includes a seat 12 disposed in sliding engagement with an adjustment mechanism 14. The adjustment mechanism 14 is secured directly or indirectly to a floor 16 of the vehicle. Adjustment of the seat within the adjustment mechanism 14 can be effected manually or electronically as a function of commands received from a user who, for example, has access to control buttons for moving the seat in the desired direction. The active material based stroking device 18 is in operative communication with the adjustment mechanism 14. As will be apparent to those of skill in the art, the active material based stroking device is suitable for most, if not all, adjustment mechanisms with minimal modifications including those electronically actuated as well as those manually actuated. Likewise, the active material based stroking device 18 is suitable for vertical and/or longitudinal adjustment mechanisms, wherein the stroking force can be tunable adjusted in either or both directions as may be desired for different applications. Other embodiments include the use of electrohydraulic, piezoelectric, MR, EAP, and SMA activated valves for fluid type stroking devices.

Figure 2:
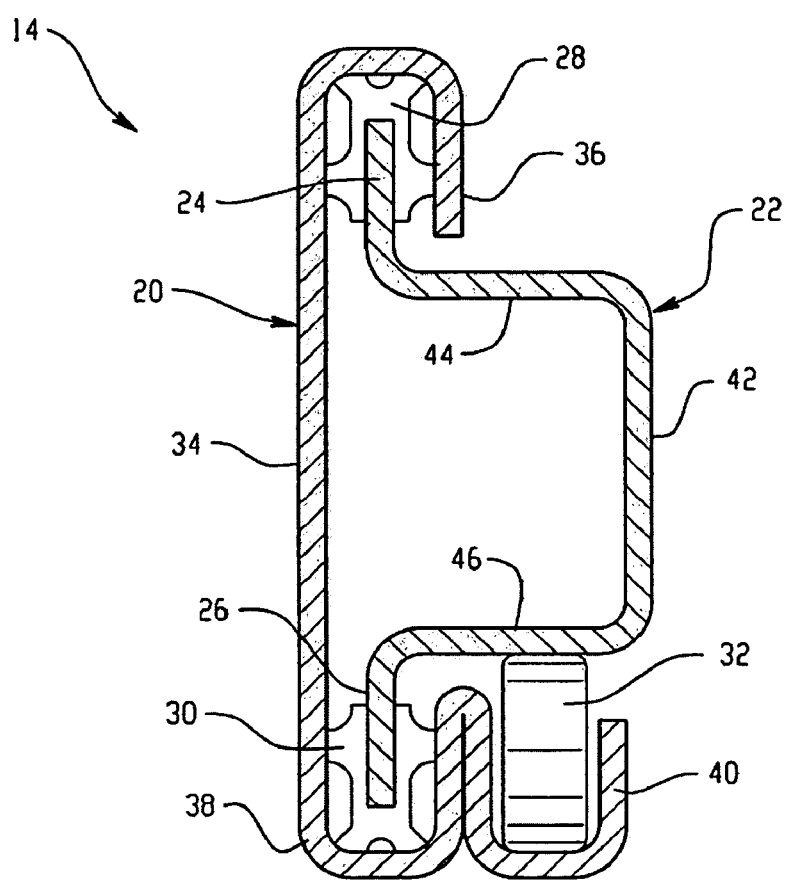
FIG. 2 is a partial sectional view of a seat adjustment mechanism.
Figure 3:
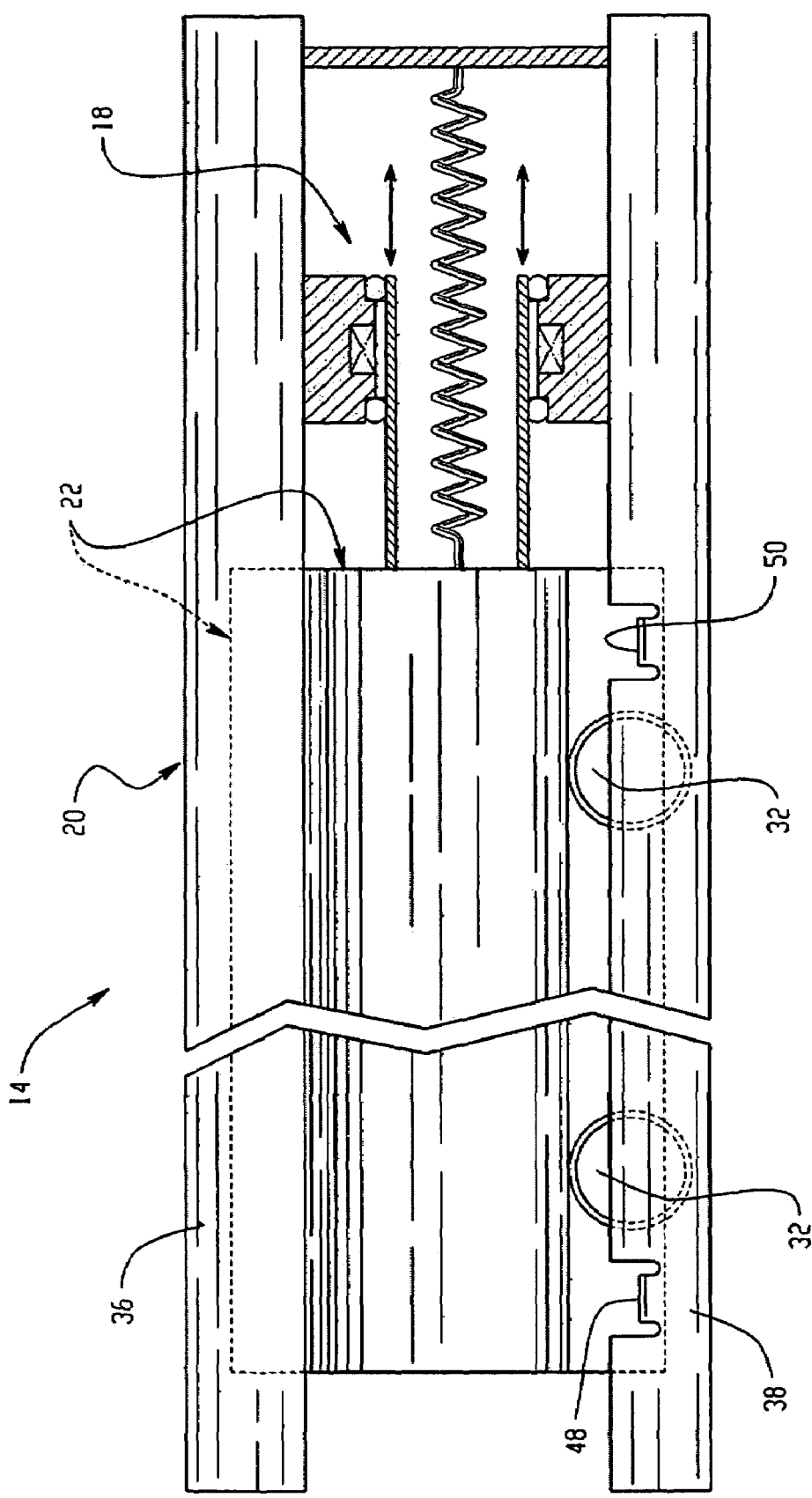
FIG. 3 is a side elevation view of the seat adjustment mechanism of FIG. 2 including a force and thus deceleration limiting energy absorbing mechanism in accordance with one embodiment.

For convenience and by way of example, reference will now be made to the following longitudinal adjustment mechanism, although as noted above, the active material based stoking device can be adapted for most, if not all, seat adjustment mechanisms. As shown in FIGS. 2-3, the component parts of the adjustment mechanism 14 generally include a guide rail 20 that is formed from one piece of roll formed sheet metal. The assembly also includes the slide rail 22 that slidably engages the guide rail 20 through the flanges 24 and 26, bushings 28 and 30 that are retained in place on the flanges, and the roller 32. The roller assures that the slide rail 22 will move smoothly longitudinal to the guide rail 20. The bushings 28, 30 assure that the slide rail 22 is stably contained vertically and laterally with respect to the guide rail 20. The arrangement of mating rails with a combination of bushings and rollers in the assembly may be constructed in other similar spatial relationships to obtain similar results.

In one embodiment, the guide rail 20 is mounted to the floor 16 of a vehicle, as shown in FIG. 1. Therefore, the guide rail 20 is stationary in relation to the vehicle. The guide rail 20 can be mounted to the vehicle by connecting a guide base wall 34, which is the vertical portion of guide rail 20, to the vehicle through fastening means that may include accessory brackets (not shown) to spatially position the guide rail 20 in a location determined by the seat design, while providing connection to the contoured surface of the vehicle's floor.

Along the top and bottom of the guide base wall 34 are three U-shaped channels 36, 38 and 40, that together with the guide base wall 34 define the guide rail 20. The top U-shaped channel 36 extends longitudinally along the top of the guide base wall 34 and opens downwardly. The bottom U-shaped channel 38, adjacent to the bottom of the guide base wall 34, extends longitudinally along the bottom of the guide base wall 34 and opens upwardly. The second bottom channel 40 is located adjacent to the first bottom channel 38, further from the guide base wall 34 than the first bottom channel 38. The second bottom channel 40 opens upwardly and extends longitudinally substantially along the length of the guide rail 20, parallel to the first bottom channel 38.

The guide rail 20 can be fabricated from sheet metal using a roll forming process. The forming process and composition of the rail are not critical and an extruded rail or otherwise properly formed rail is acceptable, provided the strength of the finished product approximates or surpasses that of roll formed sheet metal.

The slide rail 22 is connected to the vehicle seat 12 shown in FIG. 1 at the slide face wall 42, to adjustably position the seat within the vehicle. The slide rail 22 includes a slide face wall 42, sidewalls 44 and 46, and terminal flanges 24 and 26. The slide rail 22 is slidably connected to the guide rail 20 by the flanges 24 and 26, with bushings 28 and 30 disposed between the rails. The two U-shaped channels 36 and 38 of the guide rail 20 form opposing receptive cavities in which the terminal flanges 24 and 26 of the slide rail 22 are located. The terminal flanges, and thereby the slide rail, are stably contained within the channels both vertically and laterally by the bushings. The roller 32 and the bushings 28 and 30 further enable the integral flanges of the slide rail to consistently slide longitudinally within the channels along the length of the slide portion of the elongated rails. As with the guide rail, the slide rail can be fabricated from roll formed sheet metal, although that aspect is not critical to proper operation of the assembly.

The bushings 28 and 30 are fixedly retained in place along the flanges 24 and 26 and slide within the channels 36 and 38. The bushings are held in place on the slide rail flanges by providing slots in the flanges and by providing a cavity in the bushing for receiving the flange, with webs in the cavity that mate with the flange slots. The bushings can be formed from high-density polyethylene, although any of a number of well-known, non-corrosive, anti-friction bearing materials may be used.

The roller 32 is contained within the second bottom U-shaped channel 40. During normal conditions with weight on the vehicle seat, the roller bears a majority of the vertical force exerted on the bearing surfaces of the assembly. The physical arrangement of the component parts of the assembly with the roller situated as described, and contacting the bottom side wall 46 of the slide rail 22, provides the sliding ease required and allows for both manual and power operation of the basic seat adjuster assembly.

FIG. 3 illustrates the longitudinal nature of the seat adjuster assembly. The depiction is a side elevation of the basic aspects of a suitable seat adjuster mechanism for use with the active material based stroking device. The guide rail 20 is shown with the top U-shaped channel 36 and the bottom U-shaped channel 38, extending along the rail. Bent tabs 48 and 50 are formed in the channel 40. The tabs act as stops for the movement of the rollers 32. An appropriate number of rollers (two of which are shown) are used to provide adequate slidability, the number of which is not intended to be limited. The two rollers 32 shown are separated by a spacer to maintain a relative minimum positioning. This arrangement provides the required slidability. One of the tabs 48 or 50 may be pre-bent before the components are assembled. After the roller 32 and the spacer are inserted into the channel 40, and the slide rail 22, and bushings are in place, the second tab may be bent.

The slide rail may further include holes (not shown) in the face wall for providing a fastening means for attaching the slide rail to the vehicle seat 12. One method of attaching the slide rail to the seat is by pressing or welding a stud into the hole for attachment to the seat structure. Similarly, the guide rail 20 may include holes providing a fastening means for attaching the guide rail 20 to a vehicle's floor structure 16.

Figure 4:
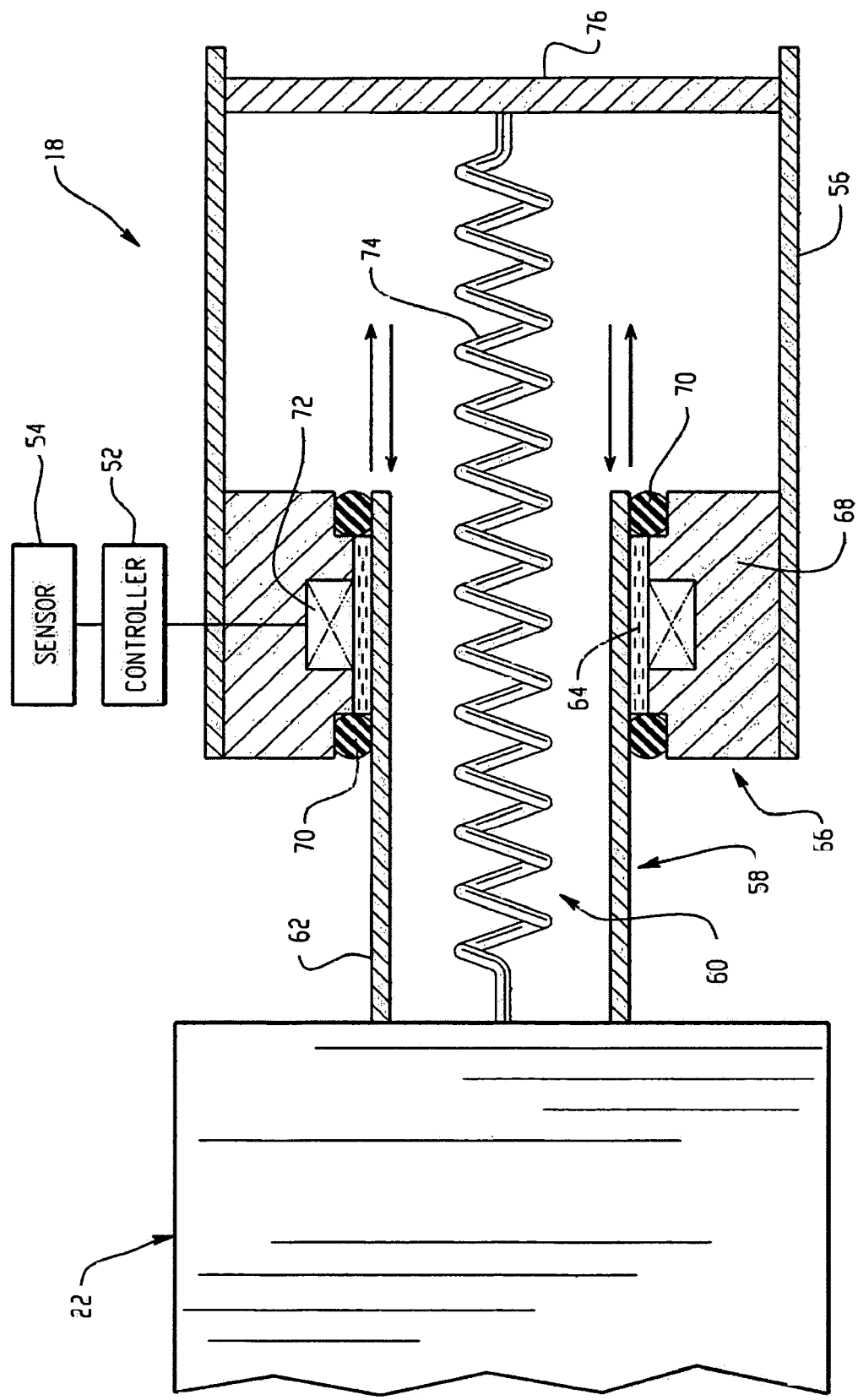
FIG. 4 a schematic representation of a cross section of a linear damper force and thus deceleration limiting energy absorbing mechanism.

As shown more clearly in FIG. 4, the deceleration and force limiting energy absorbing mechanism 18 is disposed in operative communication with the slide rail 22. The mechanism 18 further includes a controller 52 in operable communication with the active material included in and/or on the mechanism 18. The controller 52 is operable to selectively apply the activation signal to the active material to effect the change in the attribute of the active material, which enables the deceleration and force limiting energy absorbing mechanism 18 to function (i.e., to allow displacement at a situationally tunable force level).

Optionally, the deceleration and force limiting energy absorbing mechanism 18 may include a sensor 54 in operative communication with the controller 52 and configured to continuously provide relevant information to the controller 52 for selectively applying the activation signal to the active material. Suitable sensors include an occupant weight sensor, an impact sensor, a pre-impact sensor, a vehicle stability sensor, an impact velocity sensor, a seat belt use sensor, a force sensor, an accelerometer, and the like, and a combination comprising at least one of the foregoing sensors.

In one embodiment, the deceleration and force limiting energy absorbing mechanism 18 is a tunable damper containing a magnetorheological (or electrorheological) fluid for selectively controlling yield stress between a fixed portion, e.g., a guide rail 20 and a moveable portion, e.g., the slide rail 22. The damper is configured to tunably dissipate energy though the shear of an MR (or ER) fluid in contact with portions of the damper that experience relative motion during a rapid deceleration event, for example. Any suitable linear damper may be used as the deceleration and force limiting energy absorbing mechanism 18.

Suitable linear dampers include those described in commonly assigned U.S. patent application Ser. Nos. 10/691,372, 10/691,091, and 10/691,365, all of which were filed on Oct. 22, 2003 and are each incorporated herein in their entireties.

In one embodiment, a cross section of which is shown in FIG. 4, the deceleration and force limiting energy absorbing mechanism 18 is a linear damper, which includes a stationary framing member 56, a first stroking force generating energy absorbing component 58, and an optional second stroking force generating energy absorbing component 60.

The first stroking force generating energy absorbing component 58 is attached to one end of the movable slide rail 22 by member 62, wherein a magnetorheological fluid 64 controls movement of the member 62. Although the cross sectional view illustrates two framing members 56 and two support members 62, the framing member 56 and support member 62 are preferably cylindrical shaped and formed of a unitary member. Support member 62 is preferably formed from a soft magnetic material. Soft magnetic materials are defined as those materials that exhibit magnetic properties only when they are subject to a magnetizing force such as a magnetic field created when a current is passed through a wire surrounding a soft magnetic core. Soft magnetic materials are generally comprised of iron such as for example various steels, iron nickel alloys, and the like. High permeability, small coercivity, and saturation under high magnetic field generally characterize their magnetic behavior. However, the specific magnetic characteristics vary considerably depending of their composition and their fabrication processing. The soft magnetic material structure can be either non-oriented (isotropic behavior) or oriented (anisotropic behavior).

The surface structure of the first stroking force generating energy absorbing component 58 generates force and absorbs energy by slidably engaging framing member 56 via control structure 66, which is fixedly attached to the framing member 56. The control structure 66 comprises a cylindrical sleeve 68 having an annular opening dimensioned to accommodate an outer diameter of the support members 62 of the stroking force generating energy-absorbing component's 58 surface structure. The cylindrical sleeve 68 is fixedly attached to the framing member 56. Annular seals 70 are disposed at each end of the control structure 66 and abut an outer diameter of support member 62. The annular seals 70 enclose the magnetorheological fluid 64 that the support member 62 is slidably engaged with. Seals 70 also function as bearings during operation of the damper 18. A coil 72 is centrally disposed within the cylindrical sleeve 68 in close proximity to the magnetorheological fluid 64. The coil 72 is in operative communication with the controller 52, which is employed to selectively apply a magnetic field of a desired magnitude to the magnetorheological fluid 64.

The optional second stroking force generating impact energy absorbing component 60 includes a linkage 74 (e.g., spring, rolled sheet, wire mesh, foam, collapsible tube or a combination comprising at least one of the foregoing, or the like), fixedly attached at one end to transverse member 76, wherein the transverse member 76 is fixedly attached at each end to framing member 56. In one embodiment, transverse member 76 is connected to the fixed portion (not shown). Alternatively, transverse member 76 is the fixed portion. At the other end, opposite transverse member 76, the linkage 74 is fixedly attached to the slide rail 28.

In one embodiment, the linkage 74 comprises an active material, an attribute (i.e., dimension, shape, shear force, and/or flexural modulus) of which can be changed by activating the active material. In this manner, the stroking force of the second component 60 can also be controllably changed like that of the first stroking force generating energy absorbing component 58. Suitable linkages 74 are described in commonly assigned U.S. patent application Ser. No. 10/716,371, filed on Nov. 18, 2003 and is incorporated herein in its entirety.

Initially, the support member 62 is bottomed out on, or proximal to transverse member 76 and, when the vehicle undergoes the deceleration event, the forward deceleration of the seat is controlled relative to that of the vehicle by activating the MR fluid 64 with the coil 72. During operation, when an impending or occurring deceleration event is detected by the sensor 54, the coil 72 is energized to an appropriate selected current level prior to or during the actual deceleration. Suitable magnetic field strengths generated by the coil and/or a permanent magnet may range from greater than about 0 to about 1 Tesla (T), and may be selected based on information (e.g., the weight of the occupant, the rate of deceleration of the vehicle, and the like) provided by the sensor 54. When a forward acceleration of the slide rail 22 occurs by means other than intended seat adjustment by the occupant, the support member 62 is subjected to an opposing shear force owing to the effect of the magnetic field generated by the current on the magnetorheological fluid 64. The energy absorbed is preferably equal to the product of the shear force owing to the magnetorheological fluid effect and the displacement of the movable surface 22.

Optionally, the shear unit during normal operation of the vehicle can be either coupled to or decoupled from the stroking elements of the seat. For example, if the zero applied field stroking force is quite high, then one might want it to be decoupled during normal adjustment of the fore-aft position of the seat. In this embodiment, the mechanism is intended to allow variously engagement/disengagement of the MR absorber force controller depending on the specific nature of the embodiment (disconnect when adjust seat position vs. connect when crash sensed/imminent).

When the optional second energy absorbing component 58 is used with a spring, for example, as the linkage 74, the spring is stretched (below its elastic limit) as a result of the vehicle's deceleration and the resulting displacement of the seat with respect to the vehicle. The restoration force of spring 74, which is proportional to the spring constant, returns the movable surface 22 to its original position when the activation signal from the coil 72 is discontinued. If the spring 74 is made from an active material (e.g., SMA, ferromagnetic SMA, MR or ER elastomer, EAP, or the like), it can be activated by a different activation signal to facilitate the return of the spring 74 to its original shape, and thereby returning movable surface 22 to its original position. In this manner, the damper 18 is reusable.

Although illustration has been made to a specific damper, it should be apparent to those in the art that other linear dampers are equally suitable.

In still other embodiments, the deceleration and force limiting energy absorbing mechanism 18 can be a linkage based actuator, wherein the linkage comprises the active material. The linkage may include a spring, wire, layer (i.e., a block), rolled sheet, wire mesh, foam, collapsible tube, or a combination comprising at least one of the foregoing linkages. Suitable linkage actuators are described in commonly assigned U.S. patent application Ser. No. 10/716,371, which was filed on Nov. 18, 2003 and is incorporated herein in its entirety.

Figure 5:
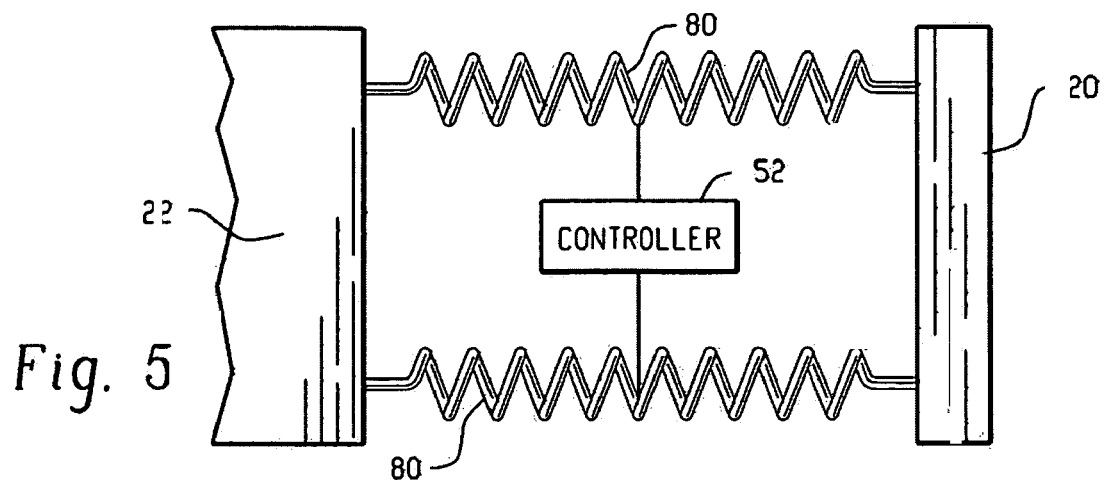
FIG. 5 is a schematic representation of a active material based linkage assembly as the force and thus deceleration limiting energy absorbing mechanism in accordance with one embodiment.
Figure 6:
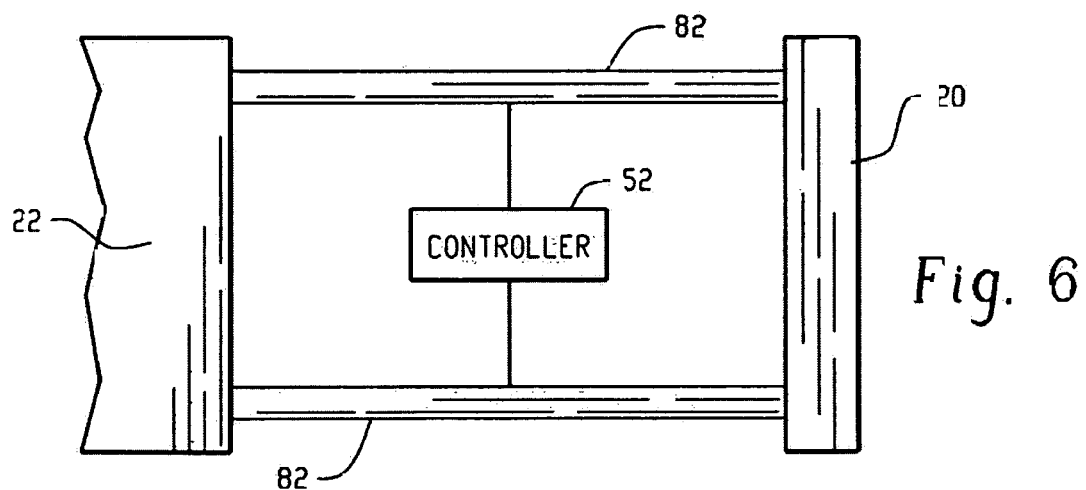
FIG. 6 is a schematic representation of an active material based linkage assembly as the force and thus deceleration limiting energy absorbing mechanism in accordance with another embodiment.
Figure 7:
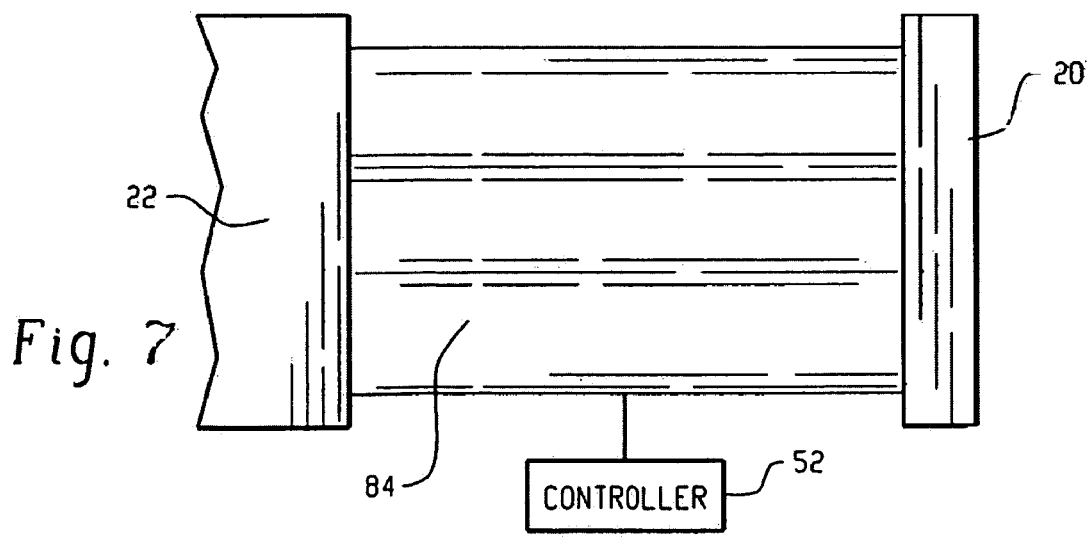
FIG. 7 is a schematic representation of an active material based linkage assembly as the force and thus deceleration limiting energy absorbing mechanism in accordance with another embodiment.

Exemplary seat assemblies 10 including linkage based actuators are shown in FIGS. 5-7. In each of these Figures, the force limiting energy absorbing mechanism 18 is attached to the fixed portion at one end, e.g. the guide rail 20, and at the other end to the movable portion, e.g., the slide rail 22, which is illustrated in various geometries.

When the deceleration and force limiting energy absorbing mechanism 18 is a spring linkage as shown in FIG. 5, it can have a sufficiently large and adjustable spring constant (adjustable through heating by a factor of up to 2.5 to 3.0 in the case of SMA) effective to resist expansion to an extent to decelerate the seat. Thus, the controller 52, by providing the activation signal, can be used to adjust the expansion force of the spring and/or return the spring to its original compressed position (utilizing its shape memory effect in the case of an SMA). Alternatively, the controller 52 can be used to controllably expand the spring 80 (by heating in the case of SMA), which has a sufficiently small spring constant (when cooled in the case of SMA) to allow an appropriately chosen return bias spring to contract it to the compressed position upon removal of the activation signal. Suitable active materials for use in spring deceleration and force limiting energy absorbing mechanisms include SMAs, ferromagnetic SMAs, MR or ER elastomers, EAPs, and combinations comprising at least one of the foregoing.

When the deceleration and force limiting energy absorbing mechanism 18 is a wire 82 or layer 84 linkage as shown in FIGS. 6 and 7, respectively, the controller 52 can be used to selectively apply the activation signal. This results in an increase in the stiffness which can be accompanied by an actuating force acting to change a dimension of the wire or layer, until such time when the activation signal is discontinued and the wire or layer returns to its original (i.e., prior to the distortion) modulus—and/or—dimension. Although these wires and/or layers can be made from shape memory active materials, they are desirably made from a piezoelectric, MR or ER elastomer, and/or electroactive polymer.

The seat assemblies shown in FIGS. 1-7 are exemplary only and are not intended to be limited to any particular shape, size, configuration, material composition, or the like. For example, the fixed portion exemplified by the guide rail 22 can include any rigid and/or permanent vehicle structural member. Likewise, the movable portion exemplified by the slide rail can include any portion of the seat assembly where it may be beneficial to provide tunable deceleration and force limiting energy absorption. Still further, it should be noted that disclosure is not limited to the linkage or the linear dampers illustrated. Other suitable deceleration and force limiting energy absorbing mechanisms include fluid based (pneumatic and/or hydraulic) stroking devices employing active material based valves. The active material based valve is in operative communication with the controller for regulating fluid flow into the device, thereby providing means for controlling the stroking force.

Figure 8:
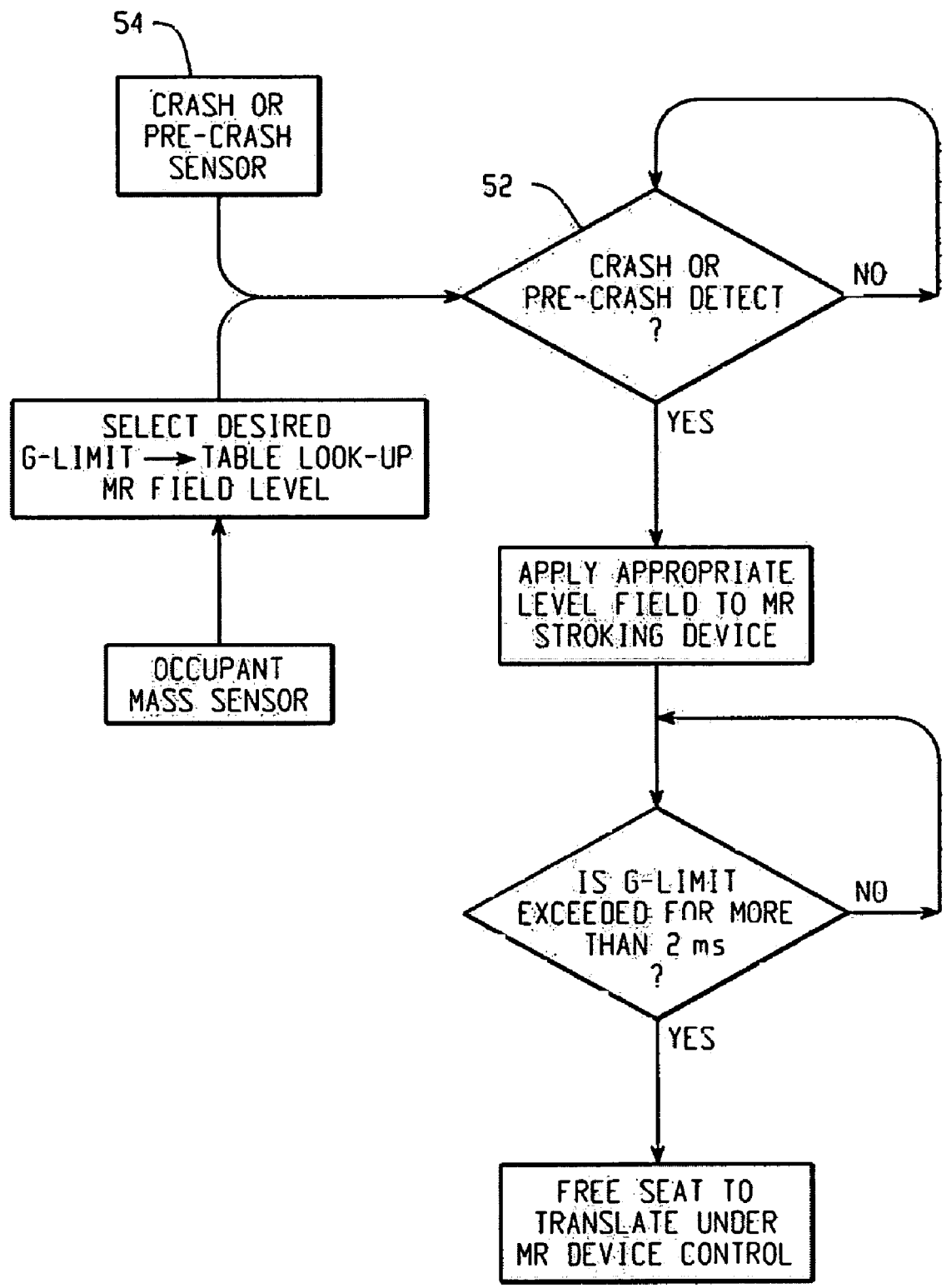
FIG. 8 is a schematic representation of control logic for the force and thus deceleration limiting energy absorbing mechanism.

Referring now to FIG. 8, there is shown an exemplary flow chart for operating the deceleration and force limiting energy absorbing mechanism to tunably control the stroking forces of the seat assembly during a deceleration event. Sensor 54 can be configured to provide pre-impact information to the controller 52, which then actuates mechanism 18 under pre-programmed conditions defined by an algorithm or the like. In this manner, the system can be used to anticipate an event such as an impact with an object and provide absorption of kinetic energy associated with the object as a result of the impact. For example, as shown, upon detection of an impact or pre-impact event, the controller provides a suitable activation signal to the active material. In this particular example, if the G-limit defined by the algorithm is exceeded for a period greater than 2 milliseconds, then the seat latch mechanism is freed to allow translation of the seat to occur under control by the mechanism 18.

As previously described, suitable active materials include, without limitation, shape memory alloys (SMA), ferromagnetic SMAs, piezoelectric materials, electroactive polymers (EAP), magnetorheological fluids and elastomers (MR), electrorheological fluids and elastomers (ER), composites of one or more of the foregoing materials with non-active materials, combinations comprising at least one of the foregoing materials, and the like.

Suitable shape memory alloys can exhibit a one-way shape memory effect, an intrinsic two-way effect, or an extrinsic two-way shape memory effect depending on the alloy composition and processing history. The two most commonly utilized phases that occur in shape memory alloys are often referred to as martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of several degrees and the start or finish of the transformation can be controlled to within a few degrees depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

The shape memory alloy may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials for use in magnetic SMAs include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"); trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Piezoelectric materials can also comprise metals such as lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Specific desirable piezoelectric materials are polyvinylidene fluoride, lead zirconate titanate, and barium titanate.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example is an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversibility.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 megaPascals (MPa). In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength.

In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.1 micrometer, with greater than or equal to about 0.5 more preferred, and greater than or equal to about 10 micrometers especially preferred. The particles are preferably present in an amount between about 5.0 to about 60 percent by volume of the total MR fluid composition.

Suitable carrier fluids include organic liquids, especially non-polar organic liquids. Examples include, but are not limited to, silicone oils; mineral oils; paraffin oils; polyalphaolefin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total M fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tristearate, lithium stearate, lithium-12-hydroxy stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, natural rubber, silicone, polybutadiene, polyethylene, polyisoprene, or other polymeric materials described herein.

Advantageously, the above noted seat stroking devices utilizing deceleration and force limiting energy absorbing mechanisms based on active materials are relatively robust and versatile. For example, it should also be recognized by those skilled in the art that the seat stroking devices described herein may be used not only during deceleration events, but also in other instances where control of the accelerations and forces felt by the belted seated occupant is desired. Such other instances include an aircraft experiencing turbulence, an aircraft contacting ground during landing, driving over a speed bump, driving over a pothole, a rear impact, and the like. In another advantageous feature that should be recognized by those skilled in the art, the seat stroking devices described herein are reversible, (i.e., they allow for energy absorption without the need for replacing the device after a single use). In yet another advantageous feature that should be recognized by those skilled in the art, the seat stroking devices described herein, through the use of sensors that can provide various information, allow for the accelerations and forces felt by a belted seated occupant to be selectively tailored or tuned based on the occupant mass and/or the vehicle deceleration rate.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A seat assembly for a vehicle, comprising:
a seat adjustment mechanism comprising a stationary rail fixedly attached to a vehicle floor and a movable rail slidably engaged with the stationary rail, wherein the seat adjustment mechanism is adapted to position a seat;
an active material based stroking device having a first end fixedly attached to a non-movable portion and a second end in operative communication with the movable rail; and
a controller in operative communication with the active material, wherein the controller selectively applies an activation signal to the active material and effects a change in an attribute of the active material, wherein the change in the attribute results in force and acceleration adjusting energy absorption.

2. The seat assembly of claim 1, wherein the active material comprises a shape memory alloy, ferromagnetic shape memory alloy, magnetorheological fluid, magnetorheological elastomer, electrorheological fluid, electrorheological elastomer, electroactive polymer, a piezoelectric material, a composite comprising at least one of the foregoing active materials with a non-active material, or a combination comprising at least one of the foregoing.

3. The seat assembly of claim 1, further comprising a sensor in operative communication with the controller, wherein the sensor is configured to provide information to the controller for selectively applying the activation signal to the active material.

4. The seat assembly of claim 3, wherein the sensor comprises a weight sensor, an impact sensor, a pre-impact sensor, deceleration force level sensor, a vehicle stability sensor, an impact velocity sensor, a seat belt use sensor, an accelerometer, or a combination comprising at least one of the foregoing sensors.

5. The seat assembly of claim 1, wherein the activation signal comprises a thermal activation signal, a magnetic activation signal, an electrical activation signal, a mechanical activation signal, a pneumatic activation signal, or a combination comprising at least one of the foregoing activation signals.

6. The seat assembly of claim 1, wherein the active material based stroking device is a linear damper, or a linkage assembly comprising a linkage formed of the active material, or a fluid stroking device comprising a active material based valve, or a combination comprising at least one of the foregoing devices.

7. The seat assembly of claim 6, wherein the linear damper comprises a control structure comprising a sleeve, a seal at each end of the sleeve, the magnetorheological fluid disposed between the seals, and a controller in proximity to the magnetorheological fluid; and the movable rail fixedly attached to a support member, wherein the support member is in sliding engagement with the seal and the magnetorheological fluid of the control structure.

8. The seat assembly of claim 7, wherein the linear damper further comprises a spring, disposed within an annular recess of the support member, having a first end fixedly attached to a stationary transverse member and a second end fixedly attached to the movable rail.

9. The seat assembly of claim 6, wherein the linkage assembly comprises a linkage coupled to the movable rail and a non-movable portion, wherein the linkage is formed of a shape memory alloy, piezoelectric, magnetorheological or electrorheological elastomer, and/or an electroactive polymer.

10. The seat assembly of claim 1, wherein the seat adjustment mechanism further comprises a power seat drive and motor assembly in operative communication with the controller, wherein the activation signal is generated by the power seat drive and motor assembly.

11. The seat assembly of claim 1, wherein the seat adjustment mechanism further comprises a seat release for providing translation of the seat by the active material based stroking device.

12. A process for limiting/reducing deceleration levels experienced by a belted seated occupant of a vehicle, the process comprising:
  detecting a deceleration event with a sensor, wherein the sensor is in operative communication with an active material based stroking device coupled to a movable rail of a seat assembly and a non-movable surface of the vehicle;
  releasing the seat assembly to provide translation of a seat within the seat assembly by the active material based stroking device;
  variably applying an activation signal to the active material to alter a stroking force of the active material based stroking device; and
  limiting and/or reducing the deceleration levels experienced by the belted seated occupant with the controlled force level stroke of the active material based stroking device.

13. The process of claim 12, further comprising sensing a weight of the belted seated occupant prior to or simultaneous with detecting the deceleration event.

14. The process of claim 12, wherein variably applying the activation signal comprises generating the activation signal from a power seat drive and motor assembly to the active material.

15. The process of claim 12, wherein the activation signal comprises a thermal activation signal, a magnetic activation signal, an electrical activation signal, a mechanical activation signal, a pneumatic activation signal, or a combination comprising at least one of the foregoing activation signals.

16. The process of claim 12, wherein the active material comprises a shape memory alloy, ferromagnetic shape memory alloy, magnetorheological fluid, magnetorheological elastomer, electrorheological fluid, electrorheological elastomer, electroactive polymer, a piezoelectric material, a composite comprising at least one of the foregoing active materials with a non-active material, or a combination comprising at least one of the foregoing.

17. The process of claim 12, wherein the active material based stroking device is a linear damper, or a linkage assembly comprising a linkage formed of the active material, or a fluid stroking device comprising a active material based valve, or a combination comprising at least one of the foregoing devices.

18. The process of claim 12, wherein reducing and/or limiting the deceleration levels experienced by the belted seated occupant with the stroke of the active material based stroking device comprises applying a magnetic signal to a magnetorheological fluid in the active material based stroking device.

19. The process of claim 12, wherein releasing the seat assembly to provide translation of the seat by the active material based stroking device comprises coupling or decoupling the movable rail to a seat rail release mechanism comprising a piezoelectric actuator or a shape memory alloy actuator.

* * * * *